United States Patent
Chavan

(10) Patent No.: US 12,015,353 B1
(45) Date of Patent: Jun. 18, 2024

(54) ATTENUATING HARMONIC CURRENT IN POWER TRANSMISSION LINES

(71) Applicant: Smart Wires Inc., Union City, CA (US)

(72) Inventor: Govind Chavan, Union City, CA (US)

(73) Assignee: Smart Wires Inc., Durham, NC (US)

( * ) Notice: Subject to any disclaimer, the term of this patent is extended or adjusted under 35 U.S.C. 154(b) by 0 days.

(21) Appl. No.: 17/571,151

(22) Filed: Jan. 7, 2022

Related U.S. Application Data

(60) Provisional application No. 63/203,194, filed on Jul. 12, 2021.

(51) Int. Cl.
| | | |
|---|---|---|
| H02M 7/219 | (2006.01) | |
| H02M 1/12 | (2006.01) | |
| H02M 7/757 | (2006.01) | |

(52) U.S. Cl.
CPC ............ H02M 7/219 (2013.01); H02M 1/12 (2013.01); H02M 7/7575 (2013.01)

(58) Field of Classification Search
CPC .......................... H02M 7/219; H02M 7/7575
See application file for complete search history.

(56) References Cited

U.S. PATENT DOCUMENTS

| | | | | |
|---|---|---|---|---|
| 4,511,834 A | * | 4/1985 | Studtmann | H02P 25/024 318/722 |
| 4,591,963 A | | 5/1986 | Retotar | |
| 4,730,243 A | * | 3/1988 | Glennon | H02M 3/28 363/44 |
| 5,016,157 A | * | 5/1991 | Rozman | H02M 5/452 363/39 |
| 5,221,877 A | | 6/1993 | Falk | |
| 5,287,288 A | * | 2/1994 | Brennen | H02J 3/01 363/54 |
| 5,345,375 A | * | 9/1994 | Mohan | H02M 1/12 363/40 |
| 5,351,178 A | * | 9/1994 | Brennen | H02J 3/01 363/40 |
| 5,359,275 A | * | 10/1994 | Edwards | H02M 1/126 363/40 |
| 5,402,087 A | | 3/1995 | Gorczak | |
| 5,491,624 A | * | 2/1996 | Levran | H02M 7/219 363/44 |
| 5,499,178 A | * | 3/1996 | Mohan | H02J 3/1842 363/39 |
| 5,677,602 A | | 10/1997 | Paul et al. | |
| 5,726,504 A | | 3/1998 | Pecukonis et al. | |
| 5,747,887 A | * | 5/1998 | Takanaga | H02J 3/28 307/64 |

(Continued)

*Primary Examiner* — Yusef A Ahmed
(74) *Attorney, Agent, or Firm* — Womble Bond Dickinson (US) LLP

(57) ABSTRACT

A series connectable power flow module is for connection to a power transmission line. The module has a full bridge inverter and a controller. The full bridge inverter has inputs for controlling charging and discharging a DC link capacitor. The controller is coupled to the inputs of the full bridge inverter. The controller is configured to separate a harmonic current from a line current flowing in the power transmission line. The controller operates the full bridge inverter in accordance with the separated harmonic current, to attenuate the harmonic current flowing in the power transmission line through injection of a DC link capacitor voltage.

21 Claims, 6 Drawing Sheets

(56) References Cited

U.S. PATENT DOCUMENTS

| | | | |
|---|---|---|---|
| 5,751,138 A * | 5/1998 | Venkata | H02J 3/01 363/43 |
| 5,936,855 A | 8/1999 | Salmon | |
| 5,977,660 A * | 11/1999 | Mandalakas | H02J 3/01 333/167 |
| 6,049,473 A * | 4/2000 | Jang | H02M 1/4258 363/44 |
| 6,208,537 B1 * | 3/2001 | Skibinski | H02M 1/12 363/40 |
| 6,208,945 B1 * | 3/2001 | Koda | G01R 27/16 324/76.19 |
| 6,249,108 B1 * | 6/2001 | Smedley | H02J 3/1842 323/207 |
| 6,407,936 B1 | 6/2002 | Tang | |
| 6,545,885 B2 * | 4/2003 | Nishimura | H02J 3/1842 363/39 |
| 7,471,529 B2 * | 12/2008 | Jin | H02M 7/2173 363/125 |
| 7,706,161 B2 | 4/2010 | Quazi | |
| 7,804,198 B2 | 9/2010 | Lowenstein | |
| 8,315,077 B2 | 11/2012 | Tadano | |
| 8,471,514 B2 | 6/2013 | Zargari et al. | |
| 8,654,553 B1 | 2/2014 | Ye et al. | |
| 8,723,372 B2 | 5/2014 | Park | |
| 8,810,182 B2 | 8/2014 | Zhou et al. | |
| 9,509,229 B2 | 11/2016 | Lee et al. | |
| 9,621,105 B2 | 4/2017 | Li et al. | |
| 9,985,515 B1 * | 5/2018 | Nikitin | H02M 7/219 |
| 10,312,881 B2 | 6/2019 | Shudarek et al. | |
| 10,541,598 B1 * | 1/2020 | Rozman | H02P 9/00 |
| 2002/0039299 A1 | 4/2002 | Nishimura et al. | |
| 2002/0093836 A1 * | 7/2002 | Goepfrich | H02P 29/50 363/16 |
| 2004/0084965 A1 | 5/2004 | Welches et al. | |
| 2004/0145357 A1 * | 7/2004 | Lynch | H02J 3/18 323/208 |
| 2007/0216343 A1 * | 9/2007 | Rozman | H02P 21/06 318/811 |
| 2008/0211315 A1 | 9/2008 | Lowenstein | |
| 2008/0219035 A1 * | 9/2008 | Wu | H02J 3/1842 363/40 |
| 2008/0315685 A1 * | 12/2008 | Mandalakas | H02J 3/1842 307/45 |
| 2010/0091534 A1 | 4/2010 | Tadano | |
| 2010/0142234 A1 * | 6/2010 | Abolhassani | H02M 5/4585 363/40 |
| 2011/0130889 A1 * | 6/2011 | Khajehoddin | G05F 1/70 700/298 |
| 2011/0215651 A1 * | 9/2011 | Yamada | H02M 1/12 307/75 |
| 2012/0056487 A1 | 3/2012 | Choi et al. | |
| 2012/0063179 A1 * | 3/2012 | Gong | H02M 1/12 363/40 |
| 2012/0081061 A1 | 4/2012 | Zargari et al. | |
| 2012/0087159 A1 * | 4/2012 | Chapman | H02J 3/44 363/41 |
| 2012/0098354 A1 | 4/2012 | Park | |
| 2013/0033907 A1 * | 2/2013 | Zhou | H02J 3/01 363/37 |
| 2013/0181654 A1 * | 7/2013 | Rozman | H02M 5/4585 318/721 |
| 2013/0207471 A1 * | 8/2013 | Divan | H02J 3/36 307/43 |
| 2013/0279214 A1 * | 10/2013 | Takase | H02M 7/68 363/37 |
| 2013/0300334 A1 * | 11/2013 | Tooyama | H02P 29/50 318/504 |
| 2014/0009980 A1 * | 1/2014 | Divan | H02M 5/458 363/37 |
| 2014/0225545 A1 * | 8/2014 | Becerra | H02P 23/26 318/400.26 |
| 2015/0016155 A1 | 1/2015 | Lee et al. | |
| 2015/0202976 A1 * | 7/2015 | Bridges | B60L 53/65 320/109 |
| 2015/0323232 A1 * | 11/2015 | Kawashima | F25B 43/003 363/48 |
| 2016/0006338 A1 * | 1/2016 | Sakimoto | H02P 9/105 363/131 |
| 2016/0099653 A1 * | 4/2016 | Divan | H02M 5/4585 363/35 |
| 2016/0226425 A1 * | 8/2016 | Kawashima | H02M 5/45 |
| 2016/0329714 A1 * | 11/2016 | Li | H02J 3/381 |
| 2016/0336941 A1 | 11/2016 | Li et al. | |
| 2017/0117816 A1 * | 4/2017 | Ohta | H02P 27/08 |
| 2017/0153051 A1 * | 6/2017 | Hatakeyama | F25B 49/02 |
| 2017/0207765 A1 | 7/2017 | Shudarek et al. | |
| 2019/0044453 A1 * | 2/2019 | Nikitin | H02M 7/217 |
| 2019/0058395 A1 * | 2/2019 | Tayebi | H02M 1/143 |
| 2019/0182917 A1 * | 6/2019 | Abdalaal | H05B 45/44 |
| 2019/0190274 A1 * | 6/2019 | Fazeli | H02J 7/35 |
| 2019/0199194 A1 * | 6/2019 | Nikitin | H02M 7/53873 |
| 2019/0237972 A1 * | 8/2019 | Wang | H02M 1/34 |
| 2019/0252881 A1 * | 8/2019 | Kono | H02M 7/48 |
| 2019/0312503 A1 * | 10/2019 | Kawashima | H02J 3/18 |
| 2020/0324665 A1 * | 10/2020 | Mackenzie | B60L 53/22 |
| 2021/0408937 A1 * | 12/2021 | Bhattacharya | H02M 7/4833 |
| 2022/0069582 A1 * | 3/2022 | Adiga Manoor | H02J 3/12 |
| 2022/0263428 A1 * | 8/2022 | Kim | H02M 1/12 |
| 2022/0393569 A1 * | 12/2022 | Katsukura | H02M 7/48 |
| 2022/0416684 A1 * | 12/2022 | Awal | H02M 3/33584 |
| 2023/0187935 A1 * | 6/2023 | Jha | H02J 3/01 290/44 |
| 2023/0238943 A1 * | 7/2023 | Zheng | H02J 3/1842 327/552 |

\* cited by examiner

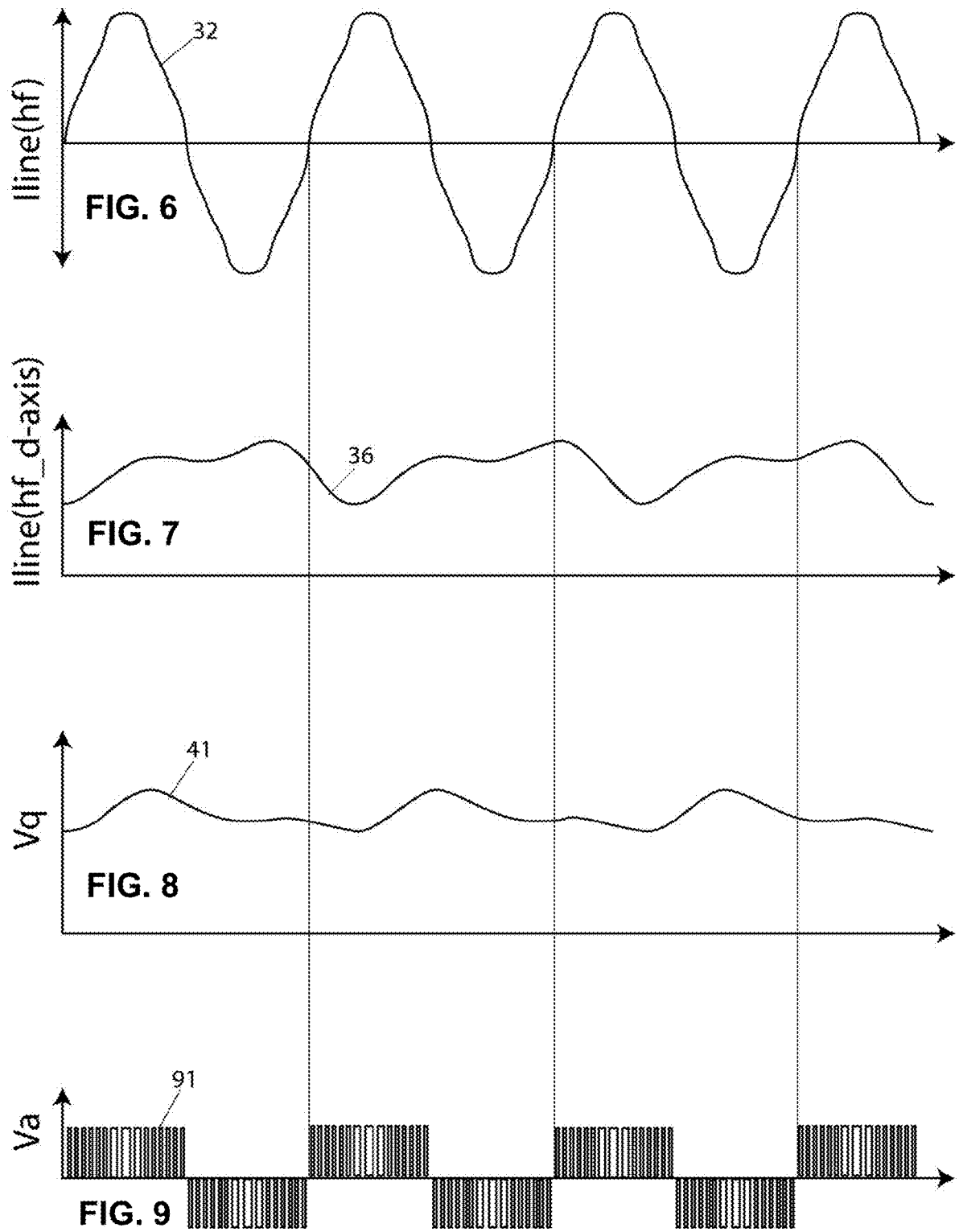

ATTENUATING HARMONIC CURRENT IN POWER TRANSMISSION LINES

CROSS REFERENCE TO RELATED APPLICATIONS

This application claims the benefit of U.S. Provisional Application No. 63/203,194 filed on Jul. 12, 2021, the disclosure of which is incorporated herein by reference.

TECHNICAL FIELD

Embodiments of the disclosure relate to attenuation of selected harmonic currents in power transmission lines using a current transformer having a high permeability core.

BACKGROUND

Harmonic currents can occur in power transmission lines, for example due to load changes and network switching. The power utility may know ahead of time what harmonic frequencies are likely to occur under various operating scenarios. It is generally desirable for a power flow control module such as a series connected FACTS to attenuate a selected high frequency harmonic component that is flowing in the line current of a power transmission line. It is in this environment that present embodiments arise.

BRIEF DESCRIPTION OF THE DRAWINGS

FIG. 6 illustrates a high-frequency transmission line current according to an embodiment.

FIG. 7 illustrates a direct component of a selected high-frequency component according to an embodiment.

FIG. 8 illustrates a quadrature component of the selected high-frequency component according to an embodiment.

FIG. 9 illustrates a voltage across a power flow control module according to an embodiment.

DETAILED DESCRIPTION

Figure 1:
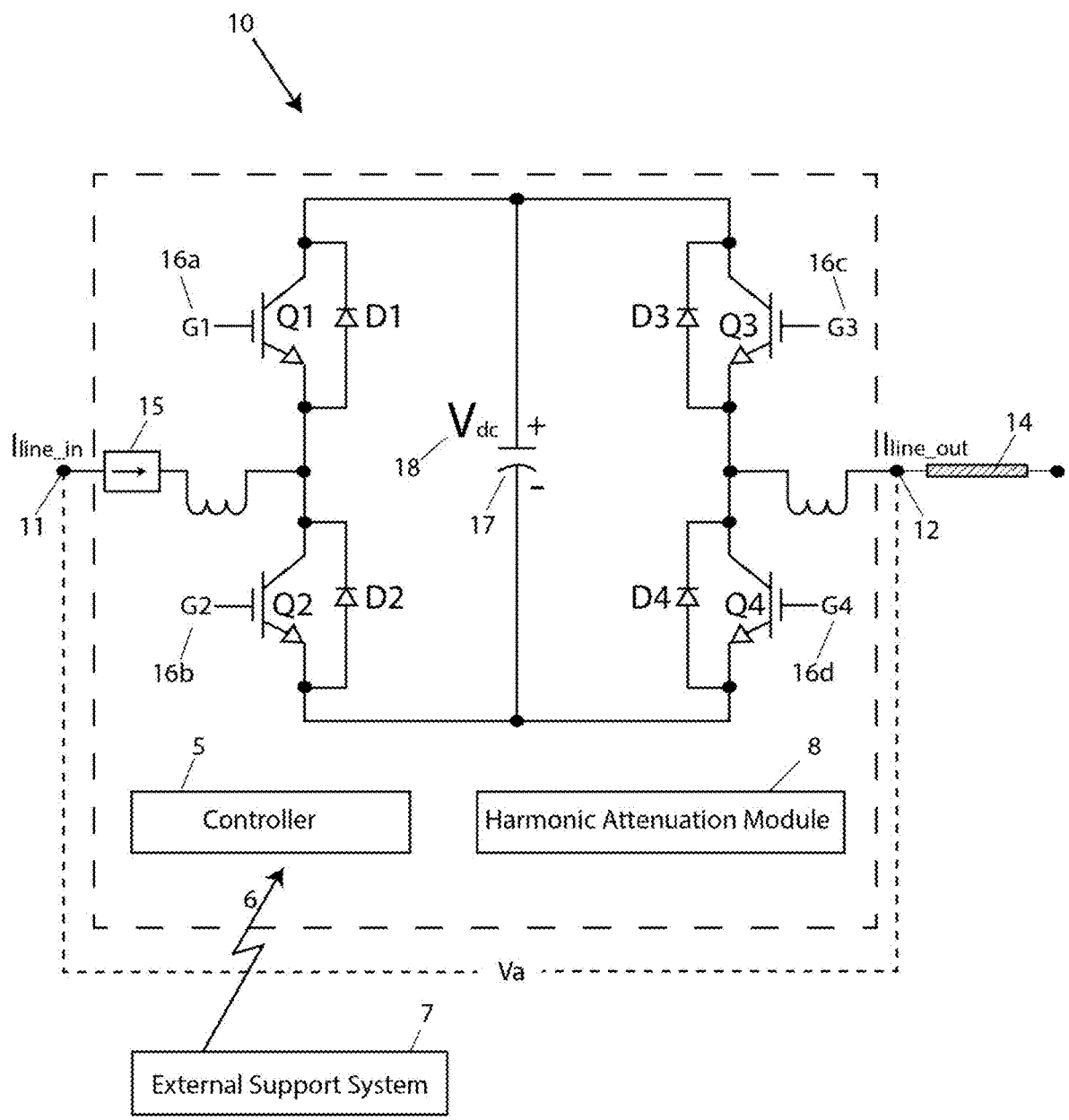
FIG. 1 illustrates a power flow control module according to an embodiment.

Harmonic currents are observed in power transmission lines, resulting from load or network switching, for example. In one embodiment of a series connected power flow control module, a sinusoidal PWM voltage injection is applied at a switching frequency substantially higher than the frequency of the disturbance to attenuate a harmonic current; hundreds of such injections may be applied during one period of line frequency. A high-pass filter is used to isolate the harmonic current component. Proportional integrators, a phase lock loop, a direct-quadrature (dq) transform and an inverse transform (1/dq) are used to create the desired high frequency injection timing.

A series connected power flow control module in the form of an impedance injection module is connected to a power transmission line and includes a full bridge inverter having inputs G1, G2, G3, and G4 for charging and discharging a DC link capacitor. A control means, for example a specially programmed controller and/or electronic circuitry, couples to full bridge inverter inputs G1, G2, G3, and G4 and is configured for attenuating a harmonic current flowing in the power transmission line through injection of a DC link capacitor voltage. The control means includes a high-pass filter for separating the harmonic current from a line current flowing in the power transmission line and a phase locked loop that is phase locked to the harmonic current component. The harmonic component may have a frequency selected by a grid operator for example. A direct quadrature (dq) converter is coupled to the phase locked loop for converting the harmonic current to a slowly varying DC value. A proportional integrator is coupled to the output of the dq converter for amplifying an error voltage to improve the stability of the control means. An inverse direct quadrature converter (1/dq) is used to create a command variable Va* that is used with a sawtooth waveform and a set of comparators to create the inputs G1, G2, G3, and G4. The frequency of the sawtooth waveform is predetermined to be in a range of 10-50 times a selected frequency of the harmonic current to be attenuated.

A method for attenuating a harmonic current flowing in a power transmission line in one embodiment includes:
providing a high-pass filter to separate the harmonic component from the line current; transforming the harmonic current to create a slowly varying DC representation of the current; computing an injection voltage for charging/discharging a DC link capacitor; comparing the injection voltage with a sawtooth waveform; and, driving inputs to a full bridge inverter coupled to the DC capacitor to attenuate the harmonic current. The step of transforming the harmonic current to create a slowly varying DC representation of the current comprises using a direct-quadrature (dq) converter. The method in one embodiment further includes using a phase locked loop and calculating a frequency of the sawtooth waveform as a multiple of the selected frequency, wherein the multiple is in a range of 10-50.

FIG. 1 illustrates a power flow control module according to an embodiment. In FIG. 1, power flow control module 10 includes a line input (Iline_In) 11 and a line output (Iline_out) 12 with an injection voltage Va 13 generated across power flow control module 10. Power flow control module 10 may be series connected in a power transmission line 14 as shown. In an embodiment, power flow control module 10 may include an impedance injection module connected into the power transmission line 14. A current sensor 15 is shown with a full bridge inverter having inputs G1 16a, G2 16b, G3 16c, and G4 16d. The full bridge inverter charges and discharges a DC link capacitor 17 which has a voltage across it of Vdc 18, which may be called the DC link capacitor voltage. Power flow control module 10 includes a controller 5 which may communicate wirelessly through a wireless link 6 with an external support system 7 as shown, in accordance with an embodiment. Multiple power flow control modules 10 may be connected in series, wherein each harmonic attenuation module 8 is applied to a different line current harmonic. i.e., a power flow control system may comprise a plurality of power flow control modules connected in series to a power transmission line, wherein each power flow control module is configured to isolate and attenuate a predetermined high frequency harmonic component of the line current flowing in the power transmission line.

Figure 2:
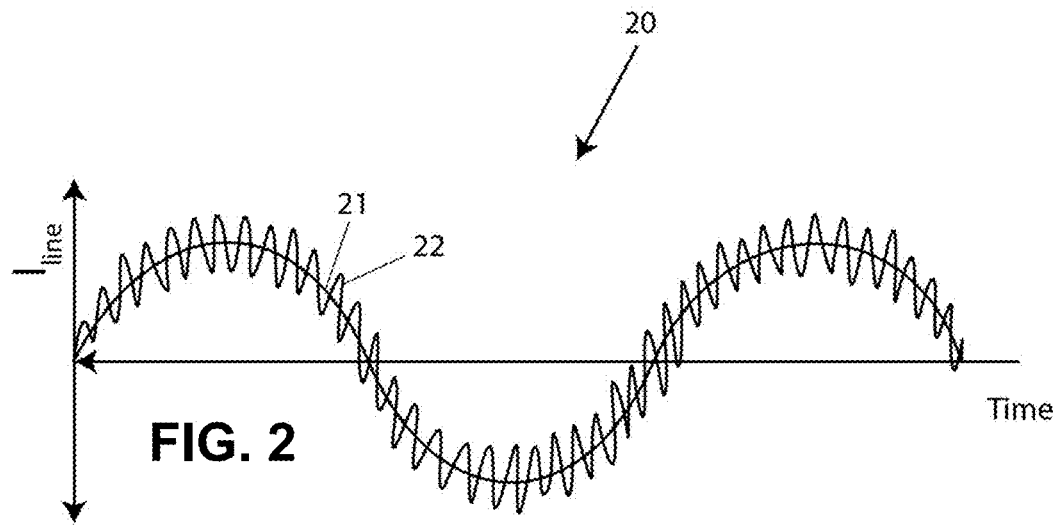
FIG. 2 illustrates a waveform for current in a power transmission line according to an embodiment.

FIG. 2 illustrates a waveform for current in a power transmission line according to an embodiment. In FIG. 2, waveform 20 in the power transmission line (Iline) includes a high frequency component 22 (e.g., high frequency harmonic current) superimposed on a fundamental component 21 (e.g., sinusoidal line current shown at a standard line frequency). Fundamental component 21 may have a frequency of 50 or 60 Hz for example. High frequency component 22 may be caused by a change in load or by network switching as examples. A grid operator may know ahead of time that a particular transmission line operating under a particular operating scenario may be likely to carry a harmonic component such as high frequency component 22. Knowledge of predictable harmonic components may be obtained by sensing of grid dynamics using various sensors, or by computer modeling for example. The grid operator may direct a manager of the power flow control module 10 to attenuate any such harmonic component. The manager may then communicate from support system 7 to controller 5 via wireless link 6 such a command to attenuate a selected high-frequency component, in accordance with an embodiment. Accordingly, in one embodiment module 10 receives information about a single predetermined harmonic frequency to attenuate, the single frequency described herein as the selected high-frequency component. A high pass filter 31 may be configured to isolate the selected frequency. If multiple high frequency harmonic components are predicted, a notch filter may be employed to isolate the selected high frequency component.

Figure 3:
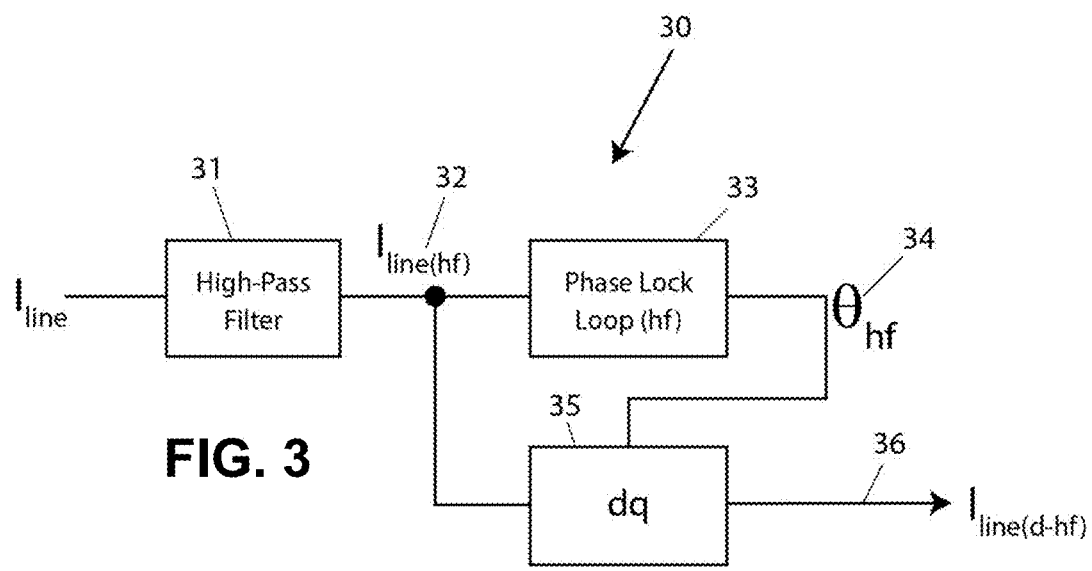
FIG. 3 illustrates a circuit as a first part of a harmonic attenuating module according to an embodiment.

FIG. 3 illustrates a circuit as a first part of a harmonic attenuating module according to an embodiment. In FIG. 3, circuit 30 may be a first part of harmonic attenuating module 8 of FIG. 1 for attenuating a selected high-frequency component, such as high frequency component 22 of FIG. 2. Circuit 30 uses a direct-quadrature (dq) transformation on a line current having high frequency harmonic components filtered out, to create a varying DC representation of the line current. In an embodiment, circuit 30 includes a high-pass filter 31 that may be programmed to pass only the selected high-frequency component, producing Iline(hf) 32 by filtering Iline_in 11 of FIG. 1. High-pass filter 31 may be a complex filter having notches in the bandpass region for example; each notch may be used to eliminate a particular harmonic at an associated frequency. This leaves just one high frequency component for the phase locked loop 33 to lock onto. The output of phase locked loop 33 is a time-varying angle θhf 34 of the high frequency component which is fed to a direct-quadrature (dq) converter 35 which also receives an input from Iline(hf) 32. The output of dq converter 35 is Iline(d-hf) 36 which is a slowly varying DC variable representing the direct component of the transmission line current, Iline.

Figure 4:
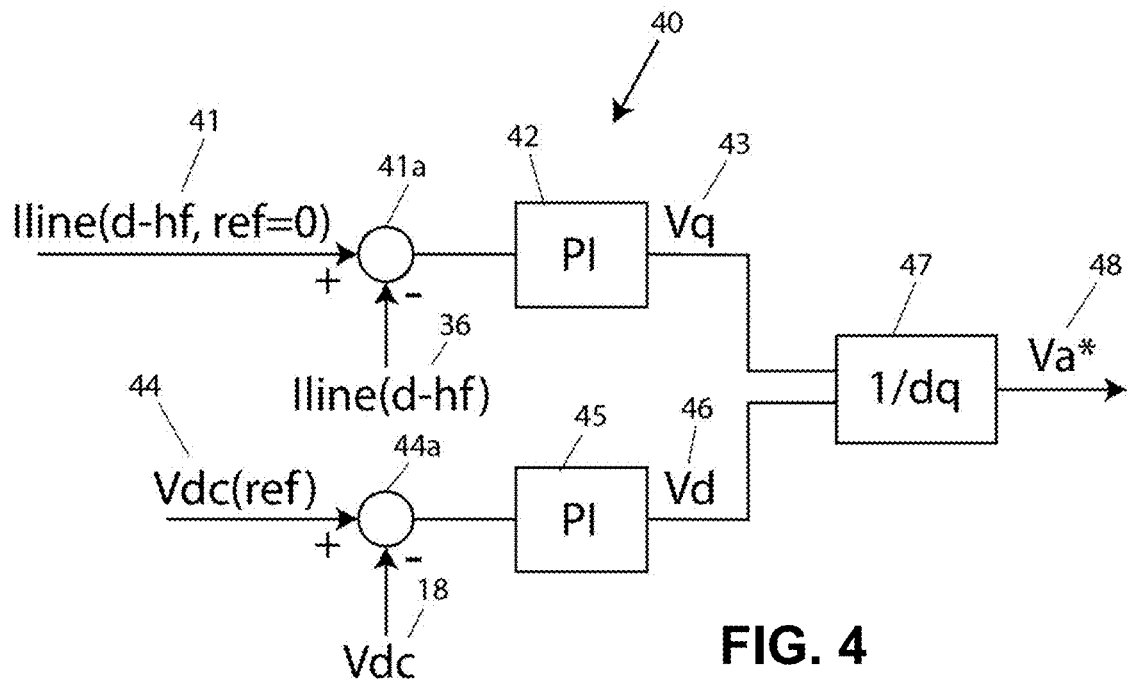
FIG. 4 illustrates a second part of the harmonic attenuating module according to an embodiment.

FIG. 4 illustrates a second part of the harmonic attenuating module according to an embodiment. In FIG. 4, second part 40 may be included in harmonic attenuating module 8 of FIG. 1. Second part 40 may use an inverse dq (1/dq) transformation to create a command variable Va* 48 used to generate a voltage to be injected on the power transmission line. Variable Va* 48 may be set to a regulatory limit on the percentage of harmonics allowed on the line. In an embodiment, Iline(d-hf, ref=0) 41 is input to a comparator 41a along with Iline(d-hf) 36 from the direct quadrature converter 35 of FIG. 3. The output of comparator 41a is amplified by proportional integrator 42 to produce quadrature output Vq 43 as a quadrature value that has a slowly varying DC characteristic as shown in FIG. 8. Vdc(ref) 44 may have a value such as 800V for example, being the desired amplitude of voltage pulses applied to DC link capacitor 17. Comparator 44a compares Vdc(ref) 44 with the present value of Vdc 18, the voltage across the DC link capacitor 17. The output of comparator 44a is amplified in proportional integrator 45 to produce direct component Vd 46, a direct value based on the DC link capacitor voltage. Vd 46 and Vq 43 are inputs to inverse dq (1/dq) converter 47 to produce Va* 48, which is a command variable for creating the desired timing of pulses applied to attenuate the high-frequency component, in accordance with an embodiment, to be further described in reference to FIG. 9.

Figure 5:
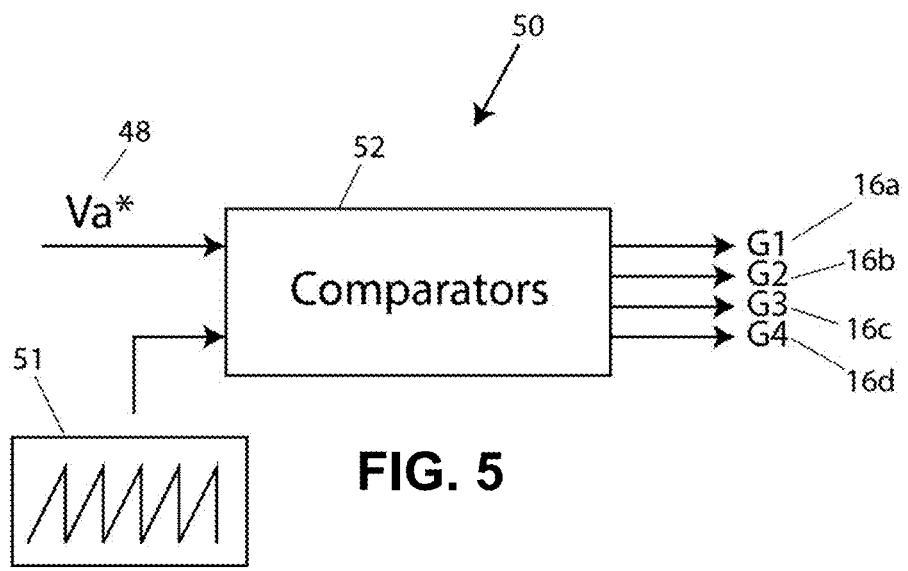
FIG. 5 illustrates a third part of the harmonic attenuating module according to an embodiment.

FIG. 5 illustrates a third part of the harmonic attenuating module according to an embodiment. In FIG. 5, third part 50 may be included in controller 5 or harmonic attenuating module 8 of FIG. 1. Third part 50 may generate gate control variables (or gate driving signals) using the command variable Va* 48 compared against a sawtooth waveform 51. In one embodiment, the controller 5 of FIG. 1 calculates a frequency of the sawtooth waveform 51 as a multiple of the selected high-frequency component of the harmonic current in the power transmission line. The multiple may be 9, 15, 21 for example. Depending on the performance characteristics of the full bridge inverter, a range of 10-50 may be suitable for this multiple, in some embodiments. In an embodiment, Va* 48 is input along with a sawtooth waveform 51 to a set of comparators 52, which may be referred to collectively as a comparator, to produce gate driving signals G1, G2, G3, and G4 of FIG. 1, in accordance with an embodiment. The desired binary comparison can be obtained using a leading or a lagging sawtooth or a triangle waveform.

FIG. 6 illustrates a high-frequency transmission line current according to an embodiment. In FIG. 6, high-frequency transmission line current 32 may be slowly varied at a fundamental frequency, Iline(hf). For example, high-frequency transmission line current 32 may have a slowly varying amplitude as shown in FIG. 6.

FIG. 7 illustrates a direct component of a selected high-frequency component according to an embodiment. In FIG. 7, direct component (Iline(hf_d-axis) 36 of the selected high-frequency component (e.g., component 22 of FIG. 2) may be a dq transformation of Iline(hf) 32 to form Iline (hf_d-axis) 36 as shown in FIG. 3.

FIG. 8 illustrates a quadrature component of the selected high-frequency component according to an embodiment. In an embodiment, quadrature component 41 of the selected high-frequency component (e.g., component 22 of FIG. 2) may be output Vq 43 of a proportional integrator 42 having an input of Iline(d-hf), as shown in FIG. 4.

FIG. 9 illustrates a voltage across a power flow control module according to an embodiment. In FIG. 9, the voltage (Va) may be applied to a series connected impedance injection module for controlling power flow. As shown, the voltage (e.g., Va 13 of FIG. 1) may be the voltage across power flow control module 10 of FIG. 1, and may be a series of injected pulses 91 acting to attenuate the selected high-frequency component of the transmission line current, in accordance with an embodiment. Va* tracks changes in the line current harmonics; the PWM pulse pattern changes in response to Va*, and thus the selected high frequency component is attenuated.

Figure 10:
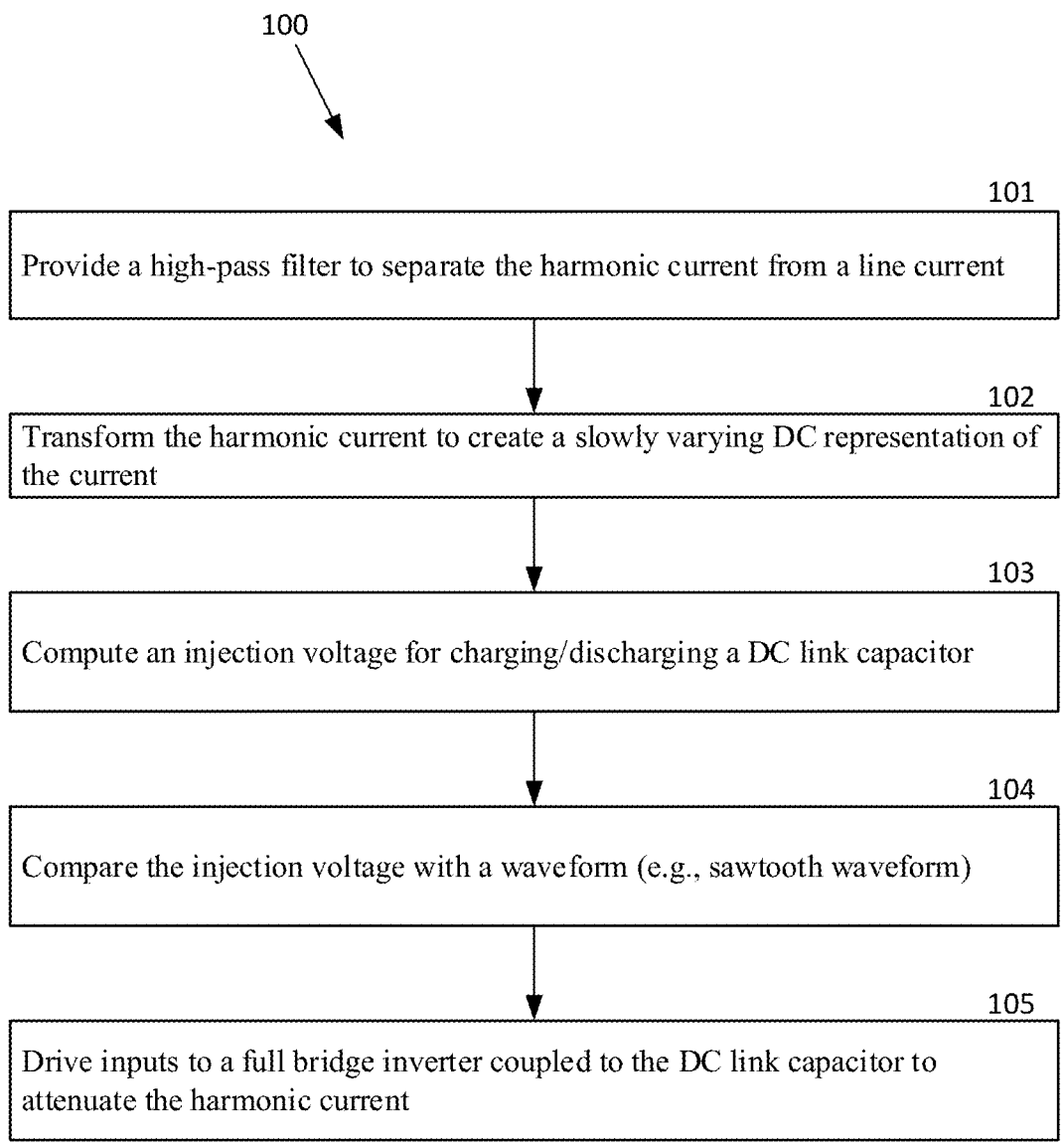
FIG. 10 is a flow diagram illustrating a method for attenuating a harmonic current flowing in a power transmission line according to an embodiment.

FIG. 10 is a flow diagram 100 illustrating a method for attenuating a harmonic current flowing in a power transmission line, in accordance with an embodiment. The method includes: providing a high-pass filter to separate the harmonic component from the line current, block 101; transforming the harmonic current to create a slowly varying DC representation of the current, block 102; computing an injection voltage for charging/discharging a DC link capacitor, block 103; comparing the injection voltage with a waveform (e.g., a sawtooth waveform), block 104; and, driving inputs to a full bridge inverter coupled to the DC capacitor to attenuate the harmonic current, block 105.

In a typical power flow control installation on a power transmission line, multiple power flow control modules 10 are connected in series. In an embodiment of such a system installation each power flow control module 10 of the present disclosure can be utilized to isolate and attenuate a different high frequency harmonic component.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different structural construct, names, and divisions. Accordingly, the disclosure of the invention is intended to be illustrative, but not limiting, of the scope of the invention.

Figure 11:
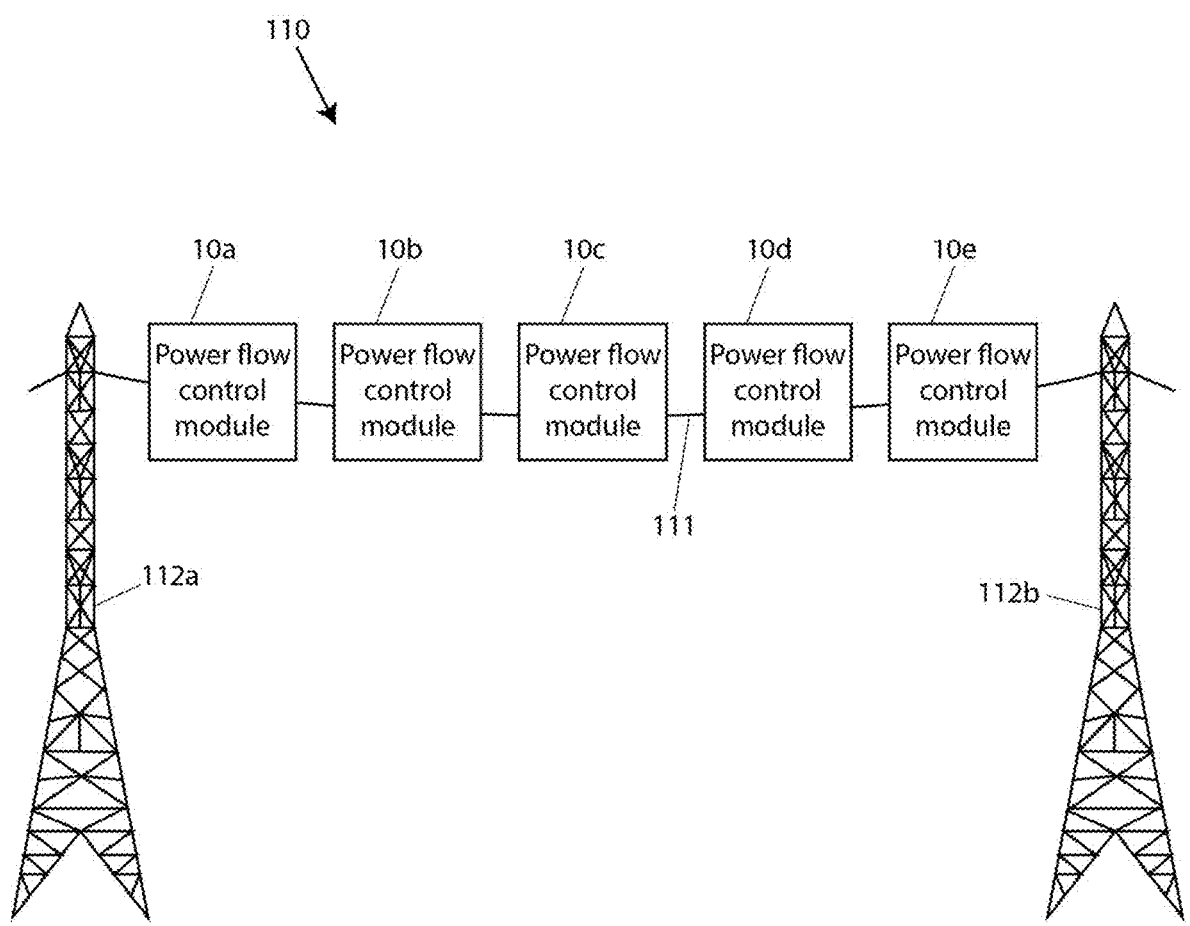
FIG. 11 illustrates a power flow control system that is series connected into a power transmission line.

FIG. 11 shows a power flow control system 110 that is series connected into a power transmission line 111 that is connected between towers 112a and 112b. Power flow control system 110 includes power flow control modules 10a-10e that are shown connected in series into transmission line 111. Each power flow control module, 10a-10e, is operable to inject impedance for power flow control. Each power flow control module, 10a-10e, is also operable to attenuate or eliminate a selected high frequency harmonic component of line current flowing in the power transmission line 111, using the harmonic attenuation module 8 provided in each power flow control module. i.e., each power flow control module, 10a-10e, is configured to isolate and attenuate a predetermined high frequency harmonic component of the line current flowing in the power transmission line.

While the invention has been described in terms of several embodiments, those of ordinary skill in the art will recognize that the invention is not limited to the embodiments described but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the invention. Other embodiments of the invention will be apparent to those skilled in the art from consideration of the specification and practice of the invention disclosed herein. Various aspects and/or components of the described embodiments may be used singly or in any combination. It is intended that the specification be considered as examples only, with a true scope and spirit of the invention being indicated by the following claims.

What is claimed is:

1. A series connectable power flow control module for connection to a power transmission line, comprising:
 a full bridge inverter having inputs for controlling charging and discharging a DC (direct current) link capacitor; and
 a controller coupled to the inputs of the full bridge inverter and configured to:
  separate, from a line current, a harmonic current flowing in the power transmission line, to produce a separated harmonic current,
  phase lock to the separated harmonic current to provide a phase locked harmonic current,
  produce a varying DC value of the separated harmonic current based on the separated harmonic current and the phase locked harmonic current, and
  operate the full bridge inverter based on the varying DC value, to inject an impedance into the power transmission line, wherein the injected impedance attenuates the harmonic current flowing in the power transmission line.

2. The power flow control module of claim 1, wherein the controller comprises a high-pass filter that separates the harmonic current from the line current.

3. The power flow control module of claim 1, wherein the controller comprises a phase locked loop to phase lock to the separated harmonic current to provide the phase locked harmonic current.

4. The power flow control module of claim 1, wherein the controller comprises a direct-quadrature (dq) converter coupled to a phase locked loop, to produce the varying DC value of the separated harmonic current based on the separated harmonic current and the phase locked harmonic current.

5. The power flow control module of claim 1, wherein the controller comprises a proportional integrator coupled to an output of a direct-quadrature (dq) converter, to produce a quadrature value based on the varying DC value.

6. The power flow control module of claim 1, wherein the controller comprises an inverse direct-quadrature (dq) converter coupled to an output of a first proportional integrator, to produce a command value based on a quadrature value produced by the first proportional integrator.

7. The power flow control module of claim 1, wherein the controller comprises an inverse direct-quadrature (dq) converter coupled to receive a reference DC value through a second proportional integrator arranged to produce a direct value based on a DC link capacitor voltage.

8. The power flow control module of claim 1, wherein the controller comprises a comparator having an output of an inverse direct-quadrature (dq) converter as a first input and arranged to have a sawtooth waveform as a second input.

9. The power flow control module of claim 8, wherein outputs of the comparator are coupled to the inputs of the full bridge inverter.

10. The power flow control module of claim 8, wherein a frequency of the sawtooth waveform is in a range of ten to fifty times a frequency of the separated harmonic current.

11. A method for attenuating a harmonic current in a power transmission line, the method comprising:
 separating, through a high-pass filter, the harmonic current from a line current of the power transmission line to produce a separated harmonic current;
 determining a selected frequency of the separated harmonic current;
 producing a varying DC (direct current) representation of the separated harmonic current based on the separated harmonic current and the selected frequency;

determining an injection voltage for charging and discharging a DC link capacitor, based on the varying DC representation of the separated harmonic current;

comparing the injection voltage with a sawtooth waveform; and driving inputs to a full bridge inverter coupled to the DC link capacitor based on the comparison, to inject an impedance into the power transmission line in accordance with the separated harmonic current, wherein the injected impedance attenuates the harmonic current in the power transmission line.

12. The method of claim 11, wherein producing the varying DC representation of the separated harmonic current comprises direct-quadrature (dq) transforming.

13. The method of claim 11, wherein:

determining the selected frequency of the separated harmonic current comprises determining the selected frequency of the separated harmonic current using a phase locked loop; and the method further comprises determining a frequency of the sawtooth waveform as a multiple of the selected frequency.

14. The method of claim 13, wherein the multiple is in a range of ten to fifty.

15. A power flow control module, for series connection to a power transmission line, comprising:

a full bridge inverter having a DC (direct current) link capacitor; and a controller coupled to the full bridge inverter the controller is configured to:

separate a harmonic current from a line current of the power transmission line to produce a separated harmonic current;

filter the separated harmonic current to determine a selected harmonic current;

phase lock to the selected harmonic current to provide a phase locked selected harmonic current;

produce a quadrature value based on the phase locked selected harmonic current;

produce a direct value based on a DC link capacitor voltage; and operate the full bridge inverter in accordance with the quadrature value and the direct value, to inject an impedance into the power transmission line, wherein the injected impedance attenuates the harmonic current in the power transmission line.

16. The power flow control module of claim 15, further comprising:

a current sensor, for the controller to detect and separate the harmonic current from the line current.

17. The power flow control module of claim 15, wherein the controller has a high-pass filter having at least one notch in a bandpass region, to filter the separated harmonic current and determine the selected harmonic current.

18. The power flow control module of claim 15, wherein the controller has a phase locked loop and a direct-quadrature (dq) converter, to phase lock and produce the quadrature value.

19. The power flow control module of claim 15, wherein the controller ha s a first comparator and a first proportional integrator to produce the quadrature value, a second comparator and a second proportional integrator to produce the direct value, and an inverse dq converter to produce a command variable for timing pulses to operate the full bridge inverter in accordance with the quadrature value and the direct value.

20. The power flow control module of claim 15, wherein the controller ha s a comparator and is to generate gate controls through the comparator, based on a sawtooth waveform and a command variable, to operate the full bridge inverter.

21. A power flow control system comprising:

a plurality of power flow control modules connected in series to a power transmission line, wherein each power flow control module is configured to isolate and attenuate a predetermined high frequency harmonic component of a line current flowing in the power transmission line through operating a full bridge inverter to inject an impedance into the power transmission line in accordance with a varying DC value produced based on a separated harmonic current and a phase locked harmonic current;

wherein a harmonic current is separated from the line current flowing in the power transmission line to produce the separated harmonic current, the phase locked harmonic current is phase locked to the separated harmonic current, and the injected impedance attenuates the predetermined high frequency harmonic component of the line current flowing in the power transmission line.

* * * * *